(12) United States Patent
Budinger et al.

(10) Patent No.: US 7,671,513 B2
(45) Date of Patent: Mar. 2, 2010

(54) PIEZOELECTRIC MOTOR ALLOWING AT LEAST TWO DEGREES OF FREEDOM, IN ROTATION AND LINEAR DISPLACEMENT

(75) Inventors: Marc René Christian Budinger, Toulouse (FR); Jean-Francois Roland Rouchon, Muret (FR); Bertrand Nogarede, Toulouse (FR)

(73) Assignees: Centre National de la Recherche Scientifique, Paris (FR); Institut National Polytechnique de Toulouse, Toulouse (FR)

( * ) Notice: Subject to any disclaimer, the term of this patent is extended or adjusted under 35 U.S.C. 154(b) by 687 days.

(21) Appl. No.: 10/554,750

(22) PCT Filed: Apr. 28, 2004

(86) PCT No.: PCT/FR2004/001036

§ 371 (c)(1),
(2), (4) Date: Sep. 14, 2006

(87) PCT Pub. No.: WO2004/098039

PCT Pub. Date: Nov. 11, 2004

(65) Prior Publication Data

US 2007/0057598 A1 Mar. 15, 2007

(30) Foreign Application Priority Data

Apr. 28, 2003 (FR) .................................. 03 05145

(51) Int. Cl.
*H01L 41/04* (2006.01)
*H02N 2/04* (2006.01)
*H02N 2/12* (2006.01)

(52) U.S. Cl. .............. 310/328; 310/323.01; 310/323.04

(58) Field of Classification Search ................................ 310/323.01–323.21, 328
See application file for complete search history.

(56) References Cited

U.S. PATENT DOCUMENTS

| 4,219,755 | A | 8/1980 | O'Neill et al. |
| 6,211,605 | B1 | 4/2001 | Burov et al. |
| 7,339,306 | B2 * | 3/2008 | Henderson ............. 310/323.02 |
| 2004/0124747 | A1 * | 7/2004 | Bugel et al. ................. 310/328 |
| 2004/0140736 | A1 * | 7/2004 | Richter ....................... 310/328 |

FOREIGN PATENT DOCUMENTS

| EP | 0 364 418 | 4/1990 |
| FR | 1 456 127 | 5/1966 |
| JP | 62085682 | 4/1987 |

* cited by examiner

*Primary Examiner*—Walter Benson
*Assistant Examiner*—Derek J Rosenau
(74) *Attorney, Agent, or Firm*—Young & Thompson

(57) ABSTRACT

A motor (1) includes a stator (4) and a rotor (6), the stator including piezoelectric actuators (11,12,21) for maneuvering staples (30A, 30Z) maintaining the stator and its linear displacement (L) along a guide (2), the actuators serving to drive the rotor in rotation (R).

18 Claims, 3 Drawing Sheets

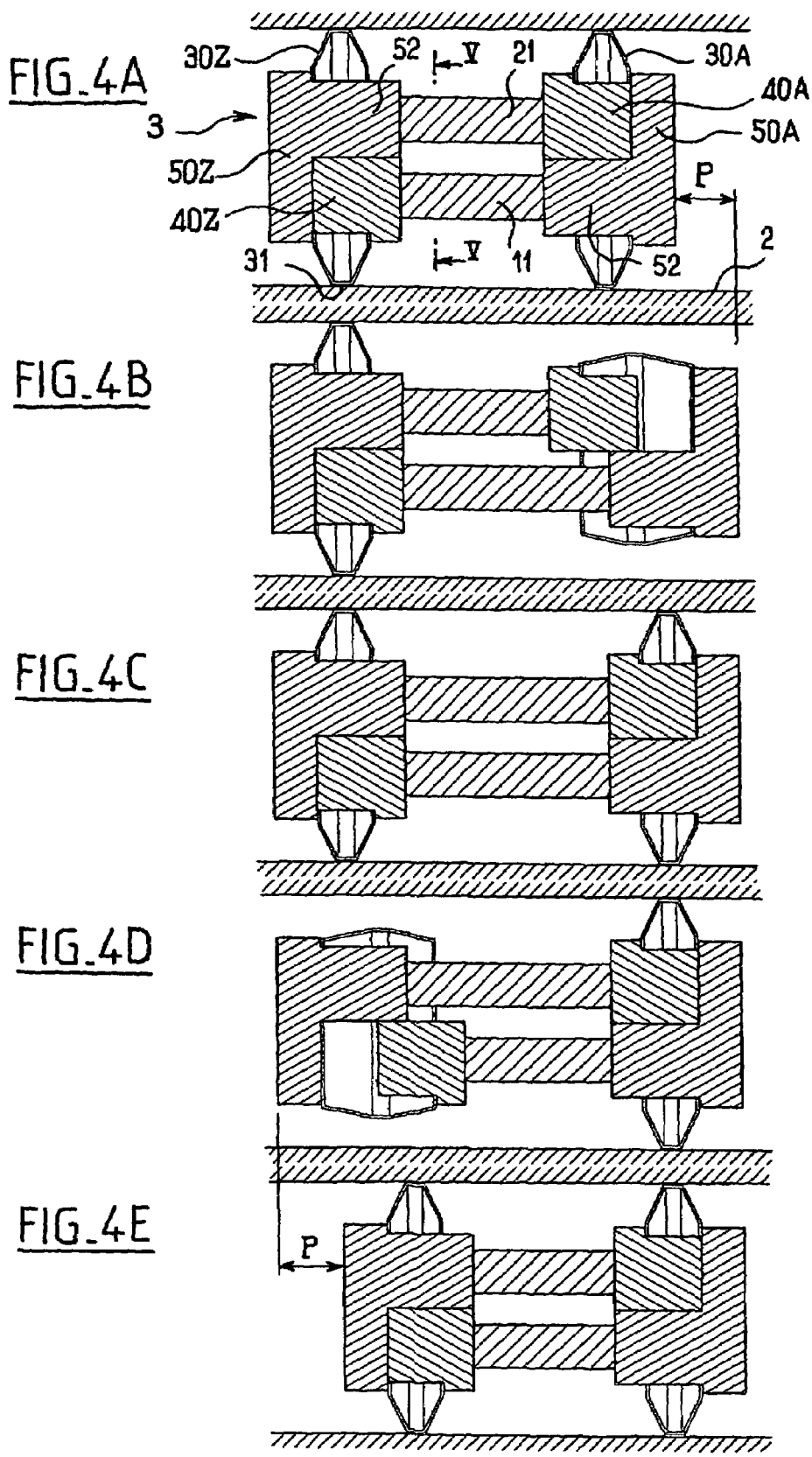

PIEZOELECTRIC MOTOR ALLOWING AT LEAST TWO DEGREES OF FREEDOM, IN ROTATION AND LINEAR DISPLACEMENT

This invention relates to a motor with two degrees of freedom, one of rotation and the other of linear displacement in a longitudinal direction, in particular a motor using electroactive materials. It also relates to an operating method of such a motor. It also relates to a mobile component comprising such a motor.

Complex mechanical systems, in particular on-board aeronautical applications, require, for example, the displacement of interlocking devices in translation and in rotation. These displacements are currently achieved by two distinct actuators, which are generally electromagnetic, which takes up space.

The purpose of the invention is to propose a motor capable of incorporating the two displacements, and that can be of a more compact format than the motors of the prior art.

This objective is achieved with a motor comprising a stator and a rotor, the stator comprising actuators for maneuvering clamps holding the stator and displacing it linearly along a guide, these same actuators being used to rotate the rotor.

According to a first feature of the invention, it relates to a motor comprising an assembly comprising at least one front clamp and one rear clamp and at least one first longitudinal two-way actuator and one second longitudinal two-way actuator, the first clamp being held between the respective front ends of said actuators, and the second clamp being held between the respective rear ends of said actuators.

Preferably, in a motor according to the invention, the front and rear ends of the first actuator are respectively positioned in front of the front and rear ends of the second actuator. The clamps are reversibly deformable in such a manner that if one of the clamps is compressed between the ends of the actuators holding it, it undergoes a transverse expansion.

This motor also comprises means for controlling alternating lengthening and shortening movements of each of the actuators, the respective movements of the first and second actuators being out of phase.

Such a motor is suitable for being mounted on a guide and the clamps are designed to be immobilized on this guide. For example, if the guide is tubular in shape, the immobilization can be done by wedging the clamp inside the guide, because of its transverse expansion, i.e. a transverse dimension of the clamp tends to become greater than that of the tubular guide and the clamp pushes on the guide and is thus immobilized against it.

If the guide is in the form of a rod or a rail about which the clamp is positioned, the immobilization can be done by squeezing the clamp onto the guide, i.e. because of the expansion of the clamp, the space available for the guide passing through it tends to become insufficient for the passage of the guide. Thus, the assembly is displaced linearly along the guide, alternately immobilising one of the clamps and moving the other forward, in a caterpillar fashion. The guide may or may not be rectilinear.

In order to provide the motor with a second degree of freedom, this motor will comprise a stator and a rotor, rotatably mobile relative to one another, and the assembly will be advantageously integrated with the stator, thus ensuring the longitudinal displacement of the stator, and therefore of the rotor and of a component mounted on the rotor to be driven by the motor. This component can then be driven in rotation, linear displacement or a combination of the two.

The actuators can comprise an electroactive material, i.e. capable of deforming under the action of an electric, in particular piezoelectric, field. Thus, the lengthening of the actuator can be determined by the lengthening of the material under the action of the electric field. Large-amplitude variations in length, i.e. of an amplitude sufficient to allow the immobilization and release of the clamps, thus allow the displacement of the assembly. The at least one actuator can be a pair of first actuators and a pair of second actuators making it possible, by means of small-amplitude variations in length, i.e. not resulting in the immobilization and release of the clamps, to create a progressive wave on the stator and drive a rotor in rotation. For this purpose it is possible to use the principle described in document EP0538791 (Canon), which presents a mode rotation piezoelectric rotary motor.

The electroactive, in particular piezo-electric, materials advantageously make it possible to ensure immobilization when the power supply is off, i.e. even when not supplied with electricity, the components, such as a rotor and a stator of such a motor, remain in fixed relative positions. For this it will be ensured that when the piezoelectric actuators are no longer supplied with electricity, the clamps nevertheless ensure sufficient immobilization.

According to a second feature of the invention, a method is proposed for linearly displacing such an assembly along a guide, comprising, starting from an initial position such that the at least one front clamp and the at least one rear clamp are both immobilized on the guide, the following steps:
lengthening of the at least one first actuator; then,
lengthening of the at least one second actuator; then,
shortening of the at least one first actuator; then,
shortening of the at least one second actuator.

The initial step was chosen arbitrarily from all the displacement steps. Thus, on the lengthening of the first actuator its rear end rests on the rear clamp, itself immobilized on the guide, whilst the front end moves forward freely.

The method thus described allows for the assembly to be "moved forward" along the guide, i.e. it allows for its linear movement from the rear to the front.

The terms "front", "rear", "in front of" and "behind", are defined relative to a longitudinal direction for the linear displacement of the assembly and of the motor equipped with this assembly.

Of course, for a reversible assembly this direction is chosen arbitrarily and the different terms are then interchangeable according to the choice made for the direction of the displacement.

Thus, in order to cause the assembly to move back the method can be described as follows.

Starting from an initial position such that the at least one front clamp and the at least one rear clamp are both immobilized on the guide, the following steps are carried out:
lengthening of the at least one second actuator; then,
lengthening of the at least one first actuator; then,
shortening of the at least one second actuator; then,
shortening of the at least one first actuator.

This corresponds only to a mechanical or semantic reversal, without the invention being different as a result, and without this changing the general operation of the motor.

A third feature of the invention is a mobile component comprising such a motor, for example an interlocking device thus motorized.

The clamps can comprise a shell made from hollow sheet, in particular metal. They can also comprise a solid and elastically deformable material, for example rubber. These clamps can also comprise, on a support band designed to come into contact with the guide, non-slip means suited to the nature of the guide and to the forces to be transmitted to it.

Motors according to the invention have the advantage of being economical and reliable. The use of piezoelectric materials is particularly suitable for making small servomotors, in particular for the aviation industry.

Other characteristics and advantages of the invention will also become apparent from the description below, which relates to non-limitative examples.

In the attached drawings:

FIGS. 4A-4E illustrate a mode of linear displacement of the motor in FIG. 1;

Figure 1:
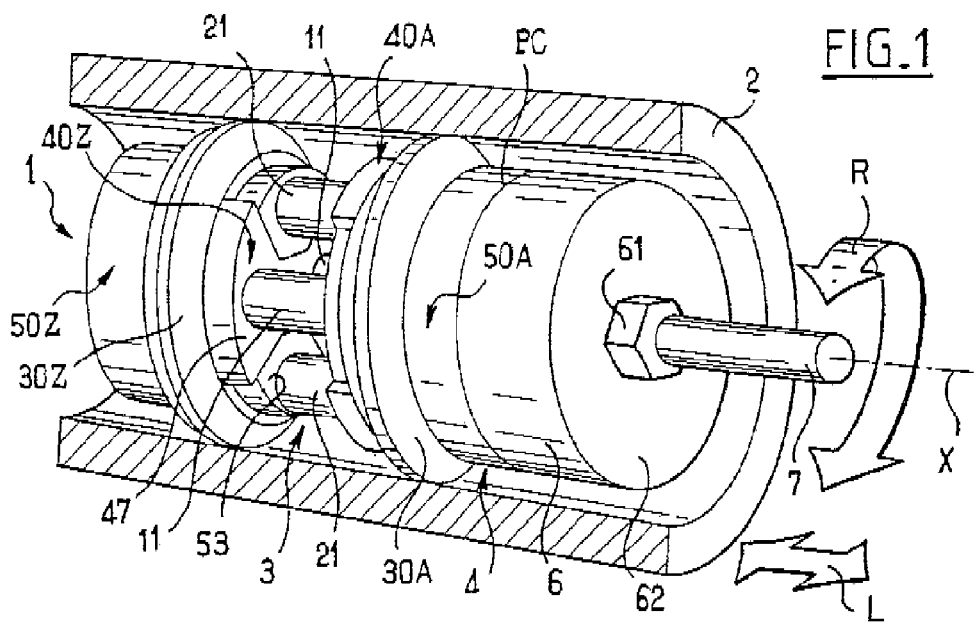
FIG. 1 is a perspective view of a motor according to the invention.
Figure 6:
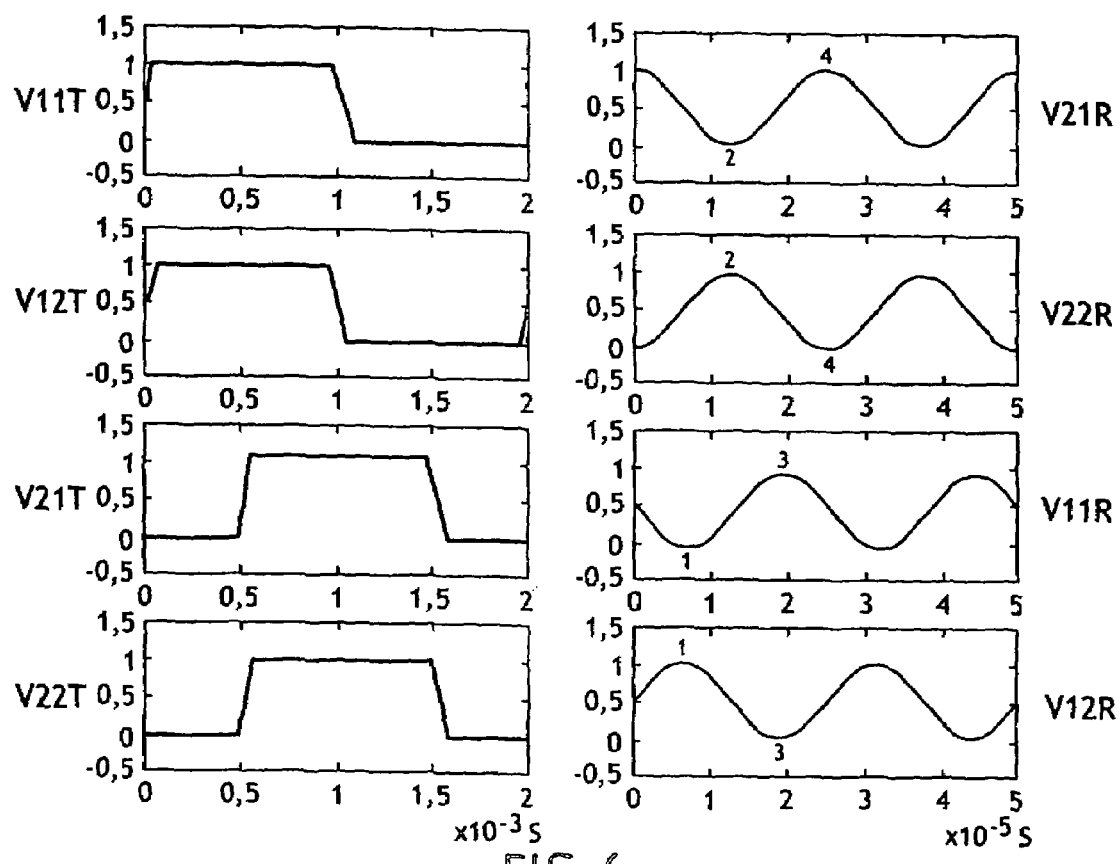

FIG. 6 an illustration of characteristic supply voltage curves as a function of time for a linear displacement and for a rotation of the motor in FIG. 1.

FIG. 1 shows a motor 1, mounted in a cylindrical tube 2, with an axis of revolution X, which acts as its guide and support. The motor comprises an assembly 3, for being displaced linearly, in a longitudinal direction L parallel to the axis X, in the tube 2. The motor 1 also comprises a rotor 6, and the assembly constitutes a stator 4 provided for driving the rotor 6 in rotation R about the axis X. The stator 4 and the rotor 6 each have a general shape of revolution the axis of which is identical to the axis X of the tube 2; they are passed through axially by a rotating shaft 7. The shaft 7 is rotatably mobile with the rotor 6; it is designed for fixing to it a component, not shown, for example an interlocking device, driven by the motor 1. The rotor and the stator are in contact in a transverse contact plane PC, i.e. perpendicular to the axis X of the tube 2. The part of the motor on which the rotor 6 is mounted is referred to as the "front". Thus, the rotor 6 is mounted in front of the stator.

Figure 2:
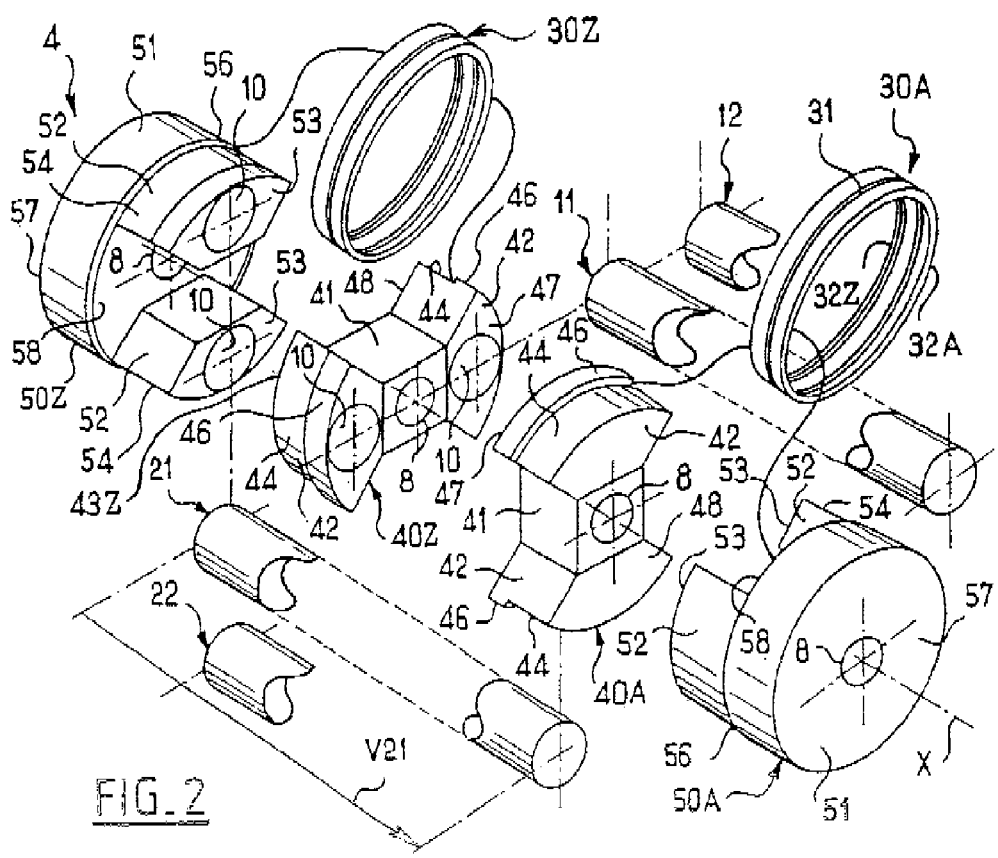
FIG. 2 is an exploded view of the stator of the motor in FIG. 1.

The stator 4 will now be described with reference to FIGS. 1 and 2. FIG. 2 is an exploded representation of the main constituent parts of the stator. These parts are: two first actuators 11, 12, including a right actuator 11 and a left actuator 12, two second actuators 21, 22, including a top actuator 21 and a bottom actuator 22, a front clamp 30A, a rear clamp 30Z, a front coupler 40A, a rear coupler 40Z, a front counterweight 50A and a rear counterweight 50Z. The two couplers are identical to each other in shape and size. The two counterweights are identical to each other in shape and size. The counterweights and the couplers are rigid parts each comprising a cylindrical orifice 8 passing through them longitudinally for the passage and guiding in rotation of the shaft 7.

The terms "left", "right", "top" and "bottom" are used only to indicate the relative position of the parts in the position of the motor as illustrated in the figures. However this position of the motor is arbitrary and the motor, in its actual configuration, can have any position, variable in space. In particular, the terms "left" and "right" relate to a view from the rear.

The rear coupler 40Z, seen from the front or the rear, is in the shape of a butterfly, a cubic body 41 of which is passed through by one of the orifices 8. It also comprises, on either side of the body, two symmetrical wings 42, extending transversally from the body 41. The coupler is limited longitudinally by two flat faces, perpendicular to the longitudinal axis X of the motor, an actuating face 47 and a stop face 48. Each of the wings is limited externally by a cylinder portion 44 revolving about the axis X, extending from the rear face 43Z and limited at the front by a shoulder 46.

The front coupler 40A is arranged facing the rear coupler 40Z in such a manner that their respective actuating faces 47 are facing each other. The couplers are also arranged offset in such a manner that the wings 42 of the rear coupler 40Z are arranged on the right and on the left of its body 41, whilst the wings of the front coupler 40A are arranged above and below its body.

The rear counterweight 50Z comprises a cylindrical weight 51 with an axis of revolution X, pierced along its axis by one of the orifices 8 and limited at the rear by an external surface 57 and at the front by an internal surface 58, both flat and perpendicular to the axis X. It also comprises two lengthening pieces 52, arranged symmetrically above and below the axis X, and extending longitudinally forwards from the internal surface 58.

The lengthening pieces 52 have shapes complementary to those of the rear coupler, so that the coupler can fit into them in such a manner that the lengthening pieces 52 serve as a longitudinal sliding guide during a relative longitudinal displacement of the coupler and counterweight. Each of the lengthening pieces is limited externally by a cylinder portion 54 revolving about the axis X, with the same diameter as the cylinder portions 44 externally limiting the wings 42. The weight 51 has a diameter greater than that of the cylinder portions, in such a manner that it forms a shoulder 56. Each lengthening piece is limited at the front by a flat face 53, perpendicular to the axis X.

The front counterweight 50A is arranged facing the rear counterweight 50Z in such a manner that their respective internal faces 58 face each other. The counterweights are also arranged offset in such a manner that the lengthening pieces 22 of the front counterweight 50A are arranged on the right and on the left thus allowing the fitting and the sliding of the front coupler 40A in the front counterweight 50A.

Thus, each lengthening piece 52 faces a wing 42, and the face 53 of each lengthening piece 52 faces a actuating face 47 of a coupler 50A, 50Z. The external face 57 of the front counterweight 50A defines the contact plane PC between said front counterweight and the rotor 6.

The actuators 11, 12, 21, 22 are revolution cylinders, identical in size and made of a piezo-electric ceramic. The actuators are arranged longitudinally, parallel to the shaft 7 and equidistant from said shaft. They are distributed evenly about the shaft 7 so that, if viewed from the front towards the rear, and if the shaft is turned in a trigonometric direction from the left actuator 12, the following will be found successively, each spaced 90 degrees from the other: the left actuator 12, the top actuator 21, the right actuator 11 then the bottom actuator 22 (see FIG. 5).

Figure 5:
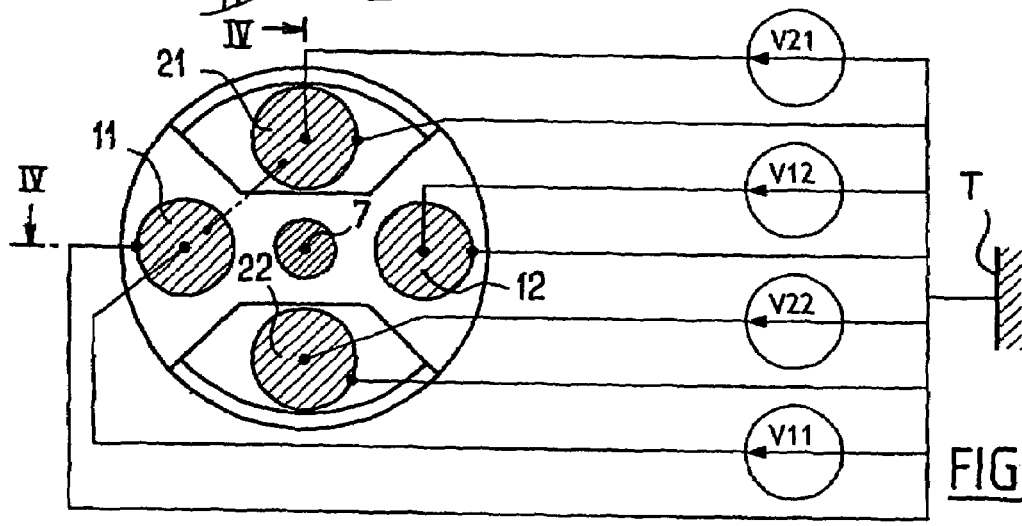
FIG. 5 is a diagram of a power supply for the motor in FIG. 1.

The motor 1 also comprises a power supply, not shown in FIGS. 1 and 2 but diagrammatically represented in FIG. 5. This supply makes it possible to apply, between two longitudinally opposite ends of each of the actuators, a voltage specific to each of the actuators. Thus, under the action of this voltage and its variation, a piezoelectric actuator can be lengthened or shortened. The actuator sizes are therefore identical only for identical voltage conditions. In FIG. 2, as an illustration, a voltage V21 applied to the top actuator 21 is shown in the form of a vector.

Each actuator is mounted fixed between the face of a lengthening piece and the actuating face of a coupler. The right actuator 11 is mounted between the right lengthening piece of the front counterweight 50A and the right wing of the rear coupler 40Z. The left actuator 12 is mounted between the left lengthening piece of the front counterweight 50A and the left wing of the rear coupler 40Z. The top actuator 21 is mounted between the top lengthening piece of the rear counterweight 50Z and the bottom wing of the front coupler 40A. The bottom actuator 22 is mounted between the bottom lengthening piece of the rear counterweight 50Z and the bottom wing of the front coupler 40A. The footprints 10 of the actuators on the rear coupler and the rear counterweight are shown in FIG. 2.

Figure 3:
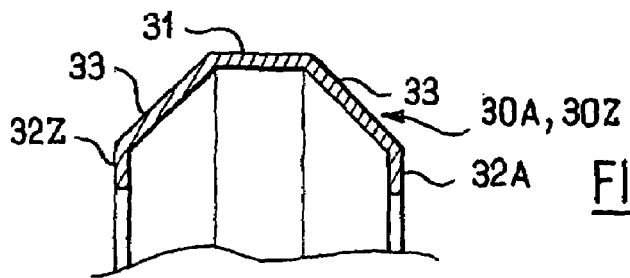
FIG. 3 is a longitudinal cross-section of a clamp, in the form of a shell, of the motor in FIG. 1.

The clamps 30A, 30Z are flexible metal shells approximately trapezoid in section. They have a shape of revolution and their internal diameter is equal to the diameter of the cylinder portions 44, 54. The two clamps are identical. A partial cross-section through a transverse plane of these is shown in FIG. 3. Each clamp comprises, on its external periphery, a cylindrical support band 31 forming the small base of the trapezium. It also comprises a front edge 32A and a rear edge 32Z the internal diameter of which defines the internal diameter of the clamp. The longitudinal spacing of the edges 32A, 32Z defines the large base of the trapezium. Each edge is linked to the support band by a tapered flank 33. The large base of the flank 33 is articulated on the support band 31 and its small base is articulated on the edge. The clamp is designed to deform radially and longitudinally under the action of a longitudinal force.

The front edge 32A of the front clamp 30A is fixed against the shoulder 56 of the front counterweight 50A and its rear edge 32Z is fixed against the shoulder 46 of the front coupler 40A. The front edge 32A of the rear clamp 30Z is fixed against the shoulder 46 of the rear coupler 40Z and its rear edge 32Z is fixed against the shoulder 56 of the rear counterweight 50Z. Thus, a longitudinal sliding of a coupler relative to the corresponding counterweight leads to a longitudinal deformation of the clamp that is fixed on the latter. The longitudinal deformation of this clamp leads to a radial deformation of said clamp. In the example illustrated, bringing the coupler and counterweight closer together produces a radial expansion of the clamp until the support band 31 of the clamp comes into contact with the inside of the tube 2, thus allowing for the engagement of the clamp on the tube. Conversely, moving the coupler and counterweight away from each other produces a radial retraction of the clamp and the separation of the support band 31 from the inside of the tube 2. In order to limit the forces on the clamps, the bringing together of a counterweight and the coupler which is fitted into it will be limited by the stop face 48 of the coupler stopping on the inside face 57 of the counterweight.

The stacks constituted by the rear counterweight 50Z, rear coupler 40Z, actuators 11, 12, 21, 22, of the front coupler 40A and front counterweight 50A are mounted pre-tensioned longitudinally on the shaft 7. This makes it possible to protect the ceramics and optimize their operation. Moreover, this ensures the locking of the translation and rotation functions when the motor is no longer supplied with electricity. The pre-tensioning means comprise at the front a nut 61 forming a stop, resting on a front face 62 of the rotor 6. These pre-tensioning means also comprise, opposite the nut 61, stop means, not shown, resting on the external face 57 of the rear counterweight 50Z. These stop means are designed to allow the lengthening and rotation of the stator relative to the shaft 7.

The shapes of the parts are drawn so as to make the figures sufficiently legible but are not necessarily optimum shapes. Thus, in order to optimize the stroke of the actuators, the motor is preferably configured so that the radial deformation of the clamps is greater in amplitude than their corresponding longitudinal deformation.

A linear movement of the motor 1 will now be described with reference to FIGS. 4A-4E. The tube being rectilinear, this movement is a translation. The figures describe a displacement of the motor by a step P forwards. A movement backwards would be carried out in the same manner. FIGS. 4A-4E are longitudinal cross-sections of the assembly 3 along a virtual surface IV-IV, shown in FIG. 5, this surface links the axis of the top actuator 21 and the axis of the right actuator 11, extends vertically upwards from the axis of the top actuator 21 and extends horizontally to the right from the axis of the right actuator 11. In the translation movement, the left actuator 12 has movements that are identical to and simultaneous with those of the right actuator 11, the only one of these two shown in FIGS. 4A-4E. Similarly, the bottom actuator 22 has movements identical to and simultaneous with those of the top actuator 21, the only one of these two shown in FIGS. 4A-4E.

FIG. 5 shows a cross-section V-V of the assembly, viewed from the front, at the level of the actuators (see FIG. 4A) and a diagram of the motor's power supply. Relative to an electric mass T, a variable voltage V11 is applied to the right actuator 11, a variable voltage V12 is applied to the left actuator 12, a variable voltage V21 is applied to the top actuator 21 and a variable voltage V22 is applied to the bottom actuator 22.

In FIG. 6, translation graphs V21T, V22T, V11T and V12T illustrate respectively the variation in voltages V21, V22, V11 and V12 during the translation in FIGS. 4A-4E. The translation graphs are graduated along the x-axis according to a millisecond time scale and along the y-axis according to an arbitrary voltage scale.

In an arbitrary initial position shown in FIG. 4A, the actuators 21, 22 have the same initial length, the clamps are engaged on the internal wall of the tube 2, and the couplers are abutting against the counterweight into which they are respectively fitted.

As illustrated in FIG. 4B and in the translation graphs in FIG. 6 between 0 and 0.5 on the x-axis, in a first phase the first actuators 11, 12 are lengthened by the length of step P under the action of voltages V11 and V12 kept constant at a value of 1. The displacement of the rear coupler 40Z being blocked by the engaging of the rear clamp 30Z, it is the front counterweight 50A that is moved forward by the step P, which has the effect of disengaging the front clamp 30A from the tube 2.

As illustrated in FIG. 4C and in the translation graphs in FIG. 6 between 0.5 and 1 on the x-axis, in a second phase the second actuators 21, 22 are lengthened by the length of step P under the action of voltages V21 and V22 kept constant at a value of 1. During this second phase the voltages V11 and V12 are kept constant at a value of 1, in order to keep the lengthening of the first actuators constant. The front coupler 40A moves closer until it abuts against the front counterweight 50A, deforming the front clamp 30A until the latter re-engages on the tube 2.

As illustrated in FIG. 4D and in the translation graphs in FIG. 6 between 1 and 1.5 on the x-axis, in a third phase the first actuators 11, 12 are shortened by the length of step P under the action of voltages V11 and V12 kept constant at a value of 0. During this second phase the voltages V21 and V22 are kept constant at a value of 1, in order to keep the lengthening of the second actuators constant. The displacement of the front counterweight 50A being blocked by the engaging of the front clamp 30A, it is the rear coupler 40Z that is moved forward by the step P, which has the effect of disengaging the rear clamp 30Z from the tube 2.

As illustrated in FIG. 4E and in the translation graphs in FIG. 6 between 1.5 and 2 on the x-axis, in a fourth phase the second actuators 21, 22 are shortened by the length of step P under the action of voltages V21 and V22 kept constant at a value of 0. During this second phase the voltages V11 and V12 are kept constant at a value of 0, in order to keep the first actuators short. The rear counterweight 50Z moves closer until it abuts against the rear coupler 40Z, deforming the rear clamp 30Z until the latter re-engages on the tube 2. The assembly 3 is thus returned to a final position similar to the initial position in FIG. 4A, but offset from the initial position by the step P.

Several steps can be taken successively. The step can be chosen as a function of the maximum permissible longitudinal deformation of the clamps. The longitudinal dimensions of the wings 42 and lengthening pieces 52 are chosen in order to ensure permanent guiding and fitting between couplers and counterweights. The duration, here 0.5 milliseconds, of each of the phases previously described is at least that necessary for each of the actuators to be lengthened or shortened by the length P.

The rotation movement is obtained by exploiting a mode rotation effect. This effect is obtained by the combination of two transverse bending modes of the stator in free-free operation, these two modes being orthogonal in relation to each other. The vibration odes of these two bending modes are situated at the level of the clamps.

The rotation graphs V21R, V22R, V11R and V12R in FIG. 6, illustrate respectively the variation in the voltages V21, V22, V11 and V12 making it possible to cause the rotation of the rotor 6 relative to the stator 4. The rotation graphs are graduated according to a millisecond time scale along the x-axis and an arbitrary voltage scale along the y-axis.

In order to cause the rotation, high-frequency sinusoidal voltages, of the order of $10^5$ Hertz, are applied to the actuators. These voltages are in phase quadrature, i.e. the voltage V11 applied to the right actuator 11 is a quarter of a period ahead of the voltage V22 applied to the bottom actuator 22, itself a quarter of a period ahead of the voltage V12 applied to the left actuator 12, itself a quarter of a period ahead of the voltage V21 applied to the top actuator 21.

Thus, the lengthening of the top actuator 21 simultaneously with the shortening of the bottom actuator 22 tends to cause the stator to bend about a virtual centre situated under the stator, whilst the lengthening of the right actuator 11 simultaneously with the shortening of the left actuator 12 tends to cause the stator to bend about a virtual centre situated to the left of the stator, and vice versa.

The successive lengthenings and shortenings of the actuators cause progressive waves on the external face 57 of the front counterweight 50A capable of driving the rotor in rotation.

The reversal of the phase lags between the different voltages makes it possible to reverse the direction of rotation of the rotor 6.

The same active components, here the two pairs of actuators, are therefore used by the motor 1, both for translation and rotation.

Of course, the invention is not limited to the examples that have just been described and numerous developments can be made to these examples without the scope of the invention being exceeded.

Thus, instead of a shell, it is for example possible to produce toric-shaped clamps from an elastomer material. Such clamps can be clamped around or inside a guide.

Instead of a rectilinear guide as described previously, the guide can be curved and thus allow for linear displacements other than simple translation.

The number of actuators can be different from four and the clamps more numerous. Thus, by using the clamps in pairs, at least two clamps being clamped to the guide at all times, the stability of the motor in the tube is increased.

Instead of a single rotor, the motor can comprise two, each at one end of the stator, one at the front and the other at the rear. These two rotors can then advantageously be linked in rotation, for example by the shaft, through the stator. This arrangement makes it possible to combine the torques provided by each of the rotors, increasing the power of the motor.

The invention claimed is:

1. Motor (1) comprising:
   a guide;
   a stator, mounted for linear displacement along the guide, the stator including a stator face;
   a rotor (6), the rotor guided for rotation (R) around an axis (X) with respect to the stator, the stator face contacting the rotor;
   two clamping means, each clamping means capable of selectively establishing an engagement between the guide and the stator; and
   a plurality of longitudinal actuators, the actuators being essentially parallel with the axis and with the guide, the actuators controllable for
   i) activating one of the clamping means and displacing the other clamping means, then activating said other clamping means and displacing said one clamping means, thereby to generate said linear displacement, and
   ii) bending the stator in a changing direction thereby to generate a rotating wave on the stator face contacting the rotor and generate said rotation (R).

2. Motor according to claim 1, wherein,
   the two clamping means comprise at least one front clamping means and one rear clamping means,
   said plurality of actuators comprise at least one first longitudinal two-way actuator having a front end and a rear end and one second longitudinal two-way actuator having a front end and a rear end,
   the first clamping means is held between said front ends, and the second clamping means is held between said rear ends,
   the front and rear ends of the at least one first actuator is positioned respectively in front of the front and rear ends of the at least one second actuator, and
   said clamping means are reversibly deformable in such a manner that if one of the clamping means is compressed between the ends of the actuators holding said one clamping means, said one clamping means undergoes a transverse expansion.

3. Motor according to claim 1, further comprising means for controlling alternating lengthening and shortening movements of each of the actuators of the plurality of actuators, said plurality of actuators comprising at least one first actuator and at least one second actuator, the respective movements of the first actuator and second actuator being out of phase.

4. Motor according to claim 1, wherein the guide is tubular and the assembly is held by wedging at least one clamping means inside the guide.

5. Motor according to claim 1, further comprising a front counterweight, a rear counterweight, a front coupler and a rear coupler, the plurality of actuators comprising at least one first actuator being mounted between the front counterweight and the rear coupler, and at least one second actuator being mounted between the front coupler and the rear counterweight, the rear counterweight and coupler serving to deform the at least one rear clamping means, the front counterweight and coupler serving to deform the at least one front clamping means.

6. Motor according to claim 1, wherein the clamping means comprise flexible metal shells.

7. Motor according to claim 1, wherein the rotor and the stator are held pretensioned in a direction parallel to linear displacement.

8. Motor according to claim 7, wherein the rotor is in contact with an external face of a front counterweight belonging to the stator.

9. Motor according to claim 8, wherein the plurality of actuators comprise a pair of first actuators and a pair of second actuators, said actuators being evenly arranged about a said axis of the motor, equidistant from this axis, each actuator occupying a position diametrically opposite that of an actuator in the same pair.

10. Motor according to claim 1, wherein the actuators comprise an electroactive material.

11. Mobile component comprising the stator and the rotor of a motor according to claim 1.

12. Motor according to claim 2, comprising means for successively causing, from an initial position in which the at least one front clamping means and the at least one rear clamping means are both immobilized on the guide:
lengthening of the at least one first actuator; then,
lengthening of the at least one second actuator; then,
shortening of the at least one first actuator; then,
shortening of the at least one second actuator.

13. Motor according to claim 2 further comprising means for controlling alternating lengthening and shortening movements of each of the actuators, the respective movements of the first actuator and second actuator being out of phase.

14. Motor according to claim 2, wherein the guide is tubular and an assembly comprising the rotor, the stator and the actuators is held by wedging at least one clamping means inside the guide.

15. Motor according to claim 3, wherein the guide is tubular and an assembly comprising the rotor, the stator and the actuators is held by wedging at least one clamping means inside the guide.

16. Motor according to claim 2, further comprising a front counterweight, a rear counterweight, a front coupler and a rear coupler, the at least one first actuator being mounted between the front counterweight and the rear coupler, the at least one second actuator being mounted between the front coupler and the rear counterweight, the rear counterweight and coupler serving to deform the at least one rear clamp, the front counterweight and coupler serving to deform the at least one front clamp.

17. Motor according to claim 3, further comprising a front counterweight, a rear counterweight, a front coupler and a rear coupler, the at least one first actuator being mounted between the front counterweight and the rear coupler, the at least one second actuator being mounted between the front coupler and the rear counterweight, the rear counterweight and coupler serving to deform the at least one rear clamping means, the front counterweight and coupler serving to deform the at least one front clamping means.

18. Motor according to claim 4, further comprising a front counterweight, a rear counterweight, a front coupler and a rear coupler, the plurality of actuators comprising at least one first actuator being mounted between the front counterweight and the rear coupler, and at least one second actuator being mounted between the front coupler and the rear counterweight, the rear counterweight and coupler serving to deform the at least one rear clamping means, the front counterweight and coupler serving to deform the at least one front clamping means.

* * * * *